(12) United States Patent
Wang et al.

(10) Patent No.: US 11,718,890 B2
(45) Date of Patent: Aug. 8, 2023

(54) HIGH-STRENGTH AND HIGH-PLASTICITY TWIP STEEL AND PREPARATION METHOD THEREOF

(71) Applicants: Jiangxi University of Science and Technology, Ganzhou (CN); Guorui Scientific Innovation Rare Earth Functional Materials (Ganzhou) Co., Ltd, Ganzhou (CN)

(72) Inventors: Zhigang Wang, Ganzhou (CN); Lingqiang Zhong, Ganzhou (CN); Jieyun Ye, Ganzhou (CN); Hebin Wang, Ganzhou (CN); Weizhen Liu, Ganzhou (CN); Weihao Cai, Ganzhou (CN); Xuwei Liu, Ganzhou (CN)

(73) Assignees: Jiangxi University of Science and Technology, Ganzhou (CN); Guorui Scientific Innovation Rare Earth Functional, Ganzhou (CN)

( * ) Notice: Subject to any disclaimer, the term of this patent is extended or adjusted under 35 U.S.C. 154(b) by 0 days.

(21) Appl. No.: 17/584,059

(22) Filed: Jan. 25, 2022

(65) Prior Publication Data

US 2023/0120906 A1 Apr. 20, 2023

(30) Foreign Application Priority Data

Oct. 15, 2021 (CN) .......................... 202111202022.2

(51) Int. Cl.
*C21D 9/46* (2006.01)
*C21D 8/02* (2006.01)
(Continued)

(52) U.S. Cl.
CPC ............... *C21D 9/46* (2013.01); *C21D 6/005* (2013.01); *C21D 8/0205* (2013.01); *C21D 8/0226* (2013.01); *C21D 8/0236* (2013.01); *C21D 8/0263* (2013.01); *C22C 38/002* (2013.01); *C22C 38/04* (2013.01)

(58) Field of Classification Search
None
See application file for complete search history.

(56) References Cited

FOREIGN PATENT DOCUMENTS

WO WO-2020157665 A1 * 8/2020

OTHER PUBLICATIONS

M. Kang, E. Shin, W. Woo, Y.-K. Lee Small-angle neutron scattering analysis of Mn—C clusters in high-manganese 18Mn—0.6 C steel Mater. Char., 96 (2014), pp. 40-45. (Year: 2014).*

* cited by examiner

*Primary Examiner* — Anthony M Liang
(74) *Attorney, Agent, or Firm* — Andrea Arndt; Dickinson Wright, PLLC (57) ABSTRACT

A high-strength and high-plasticity TWIP steel and a preparation method thereof are disclosed. In the disclosure, comprehensive properties of TWIP steel are improved by inclusion modification with Ce and Ba addition, fine grain strengthening and twinning nanocrystallization; the grain size is controlled by a low-temperature cold rolling, a transient annealing treatment and a low-temperature tempering treatment. Considering the addition of Ce, stacking fault energy of the TWIP steel is reduced, and the formation of twins, and the division of twins into grains are promoted, which further reduces a mean free path of dislocation motion, thereby improving yield strength, and finally obtaining a high-strength and high-plasticity TWIP steel.

9 Claims, 3 Drawing Sheets (51) Int. Cl.
    *C21D 6/00*     (2006.01)
    *C22C 38/04*     (2006.01)
    *C22C 38/00*     (2006.01)

FIG. 3

HIGH-STRENGTH AND HIGH-PLASTICITY TWIP STEEL AND PREPARATION METHOD THEREOF

CROSS REFERENCE TO RELATED APPLICATION

This patent application claims the benefit and priority of Chinese Patent Application No. 202111202022.2 filed on Oct. 15, 2021, the disclosure of which is incorporated by reference herein in its entirety as part of the present application.

TECHNICAL FIELD

The present disclosure relates to the field of TWIP steel technologies, and in particular, to a high-strength and high-plasticity TWIP steel and a preparation method thereof.

BACKGROUND ART

TWIP steel has high product of strength and elongation, an austenite matrix and TWIP effect, and thus is widely used in anti-collision parts and safety parts of vehicles, which could fully achieve light weight provided that the safety of vehicle use is ensured. However, due to lower yield strength of TWIP steel, there are problems such as room temperature dynamic strain aging and H-induced delayed cracking, which limits practical application of the TWIP steel.

To improve the yield strength of the TWIP steel, CN102312158A discloses a microalloyed TWIP steel containing Ti and Nb, in which the yield strength of the TWIP steel is improved by precipitation strengthening of Nb and Ti. Whereas, this method sacrifices the plasticity of the TWIP steel to some extent, so that a high-strength and high-plasticity TWIP steel could not be obtained.

In addition, H atoms introduced in the smelting process of the TWIP steel are a key factor affecting H-induced cracking. This failure mode has a greater impact on high-strength steel. The reason is that when high-strength steel is subjected to a high load, internal stress is large, and H tends to diffuse toward a region with high stress, which would form a segregation region of H, and eventually would lead to crack propagation. Therefore, how to remove or adsorb H atoms to prevent their diffusion has also become an urgent problem to be solved to obtain a high-strength and high-plasticity TWIP steel.

SUMMARY

An object of the present disclosure is to provide a high-strength and high-plasticity TWIP steel and a preparation method thereof. The high-strength and high-plasticity TWIP steel prepared by the method according to the present disclosure has higher yield strength and plasticity, and inhibits H-induced delayed cracking.

To achieve the foregoing object, the present disclosure provides the following technical solutions:

The present disclosure provides a method for preparing a high-strength and high-plasticity TWIP steel, including sequentially performing a low-temperature cold rolling, a transient annealing treatment and a low-temperature tempering treatment on a hot-rolled TWIP steel plate, to obtain a high-strength and high-plasticity TWIP steel, wherein the high-strength and high-plasticity TWIP steel includes, in percentages by mass, 0.45%-0.75% of C, 16.20%-18.80% of Mn, 0.01%-0.05% of Ce, 0.02%-0.05% of Ba, not more than 0.0015% of O, not more than 0.003% of S, not more than 0.012% of P, and a balance of Fe.

In some embodiments, Ce is introduced by adding an Fe—Ce master alloy, which has a Ce mass content of 5%, and a solid solution O content of less than 0.005%; Ba is introduced by adding a Si—Ba alloy, which has a Ba mass content of 30%, a Si mass content of 35%, and an Fe mass content of 35%.

In some embodiments, the low-temperature cold rolling is performed at a temperature of −100° C. to −50° C.

In some embodiments, during the low-temperature cold rolling, a total deformation of 20%-50% is caused.

In some embodiments, the transient annealing treatment is performed at a temperature of 700-800° C.

In some embodiments, the transient annealing treatment is performed for 60-500 s.

In some embodiments, the low-temperature tempering treatment is performed at a tempering temperature of 450-550° C.; the low-temperature tempering treatment is performed for 1-2 h.

The present disclosure further provides a high-strength and high-plasticity TWIP steel prepared by the method according to the foregoing technical solutions, wherein a microstructure of the high-strength and high-plasticity TWIP steel includes austenite structured grains and nano twins.

In some embodiments, the austenite structured grains have a grain size of 1-5 μm; a distance between the nano twins is in the range of 1-2 nm.

In some embodiments, the high-strength and high-plasticity TWIP steel has a yield strength of greater than 800 MPa, a tensile strength of greater than 1200 MPa, an elongation of greater than 50%, and a product of strength and elongation of greater than 65 GPa·%.

The present disclosure provides a method for preparing a high-strength and high-plasticity TWIP steel, including sequentially performing a low-temperature cold rolling, a transient annealing treatment and a low-temperature tempering treatment on a hot-rolled TWIP steel plate to obtain a high-strength and high-plasticity TWIP steel, wherein the high-strength and high-plasticity TWIP steel includes, in percentages by mass, 0.45%-0.75% of C, 16.20%-18.80% of Mn, 0.01%-0.05% of Ce, 0.02%-0.05% of Ba, not more than 0.0015% of O, not more than 0.003% of S, not more than 0.012% of P, and a balance of Fe. In the present disclosure, inclusion modification with Ce and Ba addition, especially to MnS, is to achieve a crushing effect, and comprehensive properties of TWIP steel could be further improved by fine grain strengthening and twinning nanocrystallization. Harmful effects of unfavorable inclusions are eliminated by means of Ce and Ba elements. Through microalloying effects of the elements and segregation at the grain boundary, grain boundary characteristics are improved, and plasticity of the TWIP steel is improved. In addition, the grain size is adjusted and controlled by the low-temperature cold rolling, the transient annealing treatment and the low-temperature tempering treatment. Also, considering the addition of Ce element, stacking fault energy of the TWIP steel is reduced, the formation of twins and the division of twins into grains are promoted, which further reduces a mean free path of dislocation motion, thereby improving yield strength, and finally obtaining a high-strength and high-plasticity TWIP steel. In addition, the location of Ce atoms could be used as an H storage site, which could adsorb H atoms and inhibit the diffusion and segregation of the H atoms to a high stress place, thereby inhibiting H-induced delayed cracking. Results of examples show that the high-strength and high-plasticity TWIP steel prepared by the method according to the present disclosure has a yield strength of 863 MPa, a tensile strength of 1322 MPa, an elongation of 50.6%, and a product of strength and elongation of 66.9 GPa·%.

DETAILED DESCRIPTION OF THE EMBODIMENTS

The present disclosure provides a method for preparing a high-strength and high-plasticity TWIP steel, including sequentially performing a low-temperature cold rolling, a transient annealing treatment and a low-temperature tempering treatment on a hot-rolled TWIP steel plate to obtain the high-strength and high-plasticity TWIP steel, wherein the high-strength and high-plasticity TWIP steel includes, in percentages by mass, 0.45%-0.75% of C, 16.20%-18.80% of Mn, 0.01%-0.05% of Ce, 0.02%-0.05% of Ba, not more than 0.0015% of O, not more than 0.003% of S, not more than 0.012% of P, and the balance of Fe.

In the present disclosure, the low-temperature cold rolling, the transient annealing treatment and the low-temperature tempering treatment are sequentially performed on a hot-rolled TWIP steel plate to obtain the high-strength and high-plasticity TWIP steel. In the present disclosure, the grain size is adjusted and controlled by the low-temperature cold rolling, the transient annealing treatment and the low-temperature tempering treatment. Considering the addition of Ce element, stacking fault energy of the TWIP steel is reduced, and the formation of twins and the division of twins into grains are promoted, which further reduces a mean free path of dislocation motion, thereby improving yield strength, and finally obtaining a high-strength and high-plasticity TWIP steel.

In some embodiments of the present disclosure, the hot-rolled TWIP steel plate is prepared by a process including performing a homogenizing annealing and a hot rolling on a TWIP steel forging ingot to obtain the hot-rolled TWIP steel plate.

In the present disclosure, there is no special limitation on operations of the homogenizing annealing and the hot rolling, and a technical solution of homogenizing annealing and hot rolling well known to a person skilled in the art may be used. In some embodiments of the present disclosure, the homogenizing annealing is performed at a temperature of 1200-1250° C. In some embodiments, the homogenizing annealing is performed for 2-2.5 h. In some embodiments of the present disclosure, the hot rolling is performed for 5-6 passes. In some embodiments, a reduction per pass during the hot rolling is more than 30%. In some embodiments, a total reduction rate during the hot rolling is 80%-85%. In some embodiments, an initial rolling temperature during the hot rolling is in the range of 1150-1180° C. In some embodiments, a means for cooling after the hot rolling is an air cooling.

Similar to a conventional process, a TWIP steel forging ingot is prepared by a process comprising a smelting, and a casting. In the present disclosure, Ce and Ba are added before and/or during the smelting. In some embodiments, Ce is added in the form of an Fe—Ce master alloy. In some embodiments, the Fe—Ce master alloy has a Ce mass content of 5%, and a solid solution O content of less than 0.005%. In some embodiments, Ba is added in the form of a Si—Ba alloy. In some embodiments, the Si—Ba alloy has a Ba mass content of 30%, a Si mass content of 35%, and an Fe mass content of 35%.

In some embodiments, other raw materials are also added such that the finally prepared high-strength and high-plasticity TWIP comprises, in percentages by mass, 0.45%-0.75% of C, 16.20%-18.80% of Mn, 0.01%-0.05% of Ce, 0.02%-0.05% of Ba, not more than 0.0015% of O, not more than 0.003% of S, not more than 0.012% of P, and a balance of Fe.

In the present disclosure, after the hot-rolled TWIP steel plate is obtained, the low-temperature cold rolling is performed on the hot-rolled TWIP steel plate to obtain a cold-rolled plate. In the present disclosure, cold rolling is performed at low temperature, dislocation slip is difficult, and stacking fault energy is lower, which is beneficial to the generation of twins. In addition, due to the interaction of a large number of primary deformation twins and secondary deformation twins, the grains are refined to a nanometer level, which is beneficial to improving the yield strength of the TWIP steel. In addition, when the rolling temperature is lower, the DSA effect could be significantly reduced, and the surface of the TWIP steel is prevented from wrinkling during the rolling, which is beneficial to improving surface quality of the plate.

In some embodiments of the present disclosure, the low-temperature cold rolling is performed at a temperature of −100° C. to −50° C., preferably at −80° C. to −55° C. In some embodiments of the present disclosure, a rolling temperature of the low-temperature cold rolling is controlled to be within the foregoing range, which is beneficial to improving the yield strength of the TWIP steel and improving the surface quality of the TWIP steel plate. In some embodiments of the present disclosure, a total deformation of 20%-50% during the low-temperature cold rolling is caused, preferably 20%-35%, and more preferably 20%-30%. In the present disclosure, there is no special requirement on the reduction per pass during the low-temperature cold rolling, provided that the plate does not crack.

In the present disclosure, after the cold-rolled plate is obtained, the transient annealing treatment is performed on the cold-rolled plate to obtain an annealed rolled plate. In the present disclosure, the transient annealing treatment enables the generation of a part of extremely fine grains in the TWIP steel, which ensures the work hardening capacity and plasticity of the TWIP steel.

In some embodiments of the present disclosure, the transient annealing treatment is performed at a temperature of 700-800° C., preferably at 750-800° C. In some embodiments of the present disclosure, an annealing temperature of the transient annealing treatment is controlled to be within the foregoing range, and the annealing temperature during the transient annealing treatment is higher than a recrystallization temperature, which is beneficial to forming a structure in which nano twins and ultrafine recrystallized grains coexist, and toughening the TWIP steel. In some embodiments of the present disclosure, the transient annealing treatment is performed in a protective atmosphere.

In some embodiments of the present disclosure, the transient annealing treatment is performed for 60-500 s, preferably for 60-300 s, and more preferably for 60-120 s.

In the present disclosure, after the annealed rolled plate is obtained, the low-temperature tempering treatment is performed on the annealed rolled plate to obtain the high-strength and high-plasticity TWIP steel. In the present disclosure, the low-temperature tempering treatment enables the restoration of dislocation accumulated in nano twin clusters, and reduced lattice distortion and internal stress of materials, thereby preventing H-induced delayed cracking.

In some embodiments of the present disclosure, the low-temperature tempering treatment is performed at a temperature of 450-550° C., preferably at 450-500° C., and more preferably at 450-490° C. In some embodiments of the present disclosure, a tempering temperature during the low-temperature tempering treatment is controlled to be not higher than the recrystallization temperature, which is beneficial to adjusting and controlling the grain size and improving the yield strength of the TWIP steel, so as to obtain a high-strength and high-plasticity TWIP steel.

In some embodiments of the present disclosure, the low-temperature tempering treatment is performed for 1-2 h, and preferably for 1 h. In some embodiments of the present disclosure, a device for the low-temperature tempering treatment is a muffle furnace.

Figure 1:
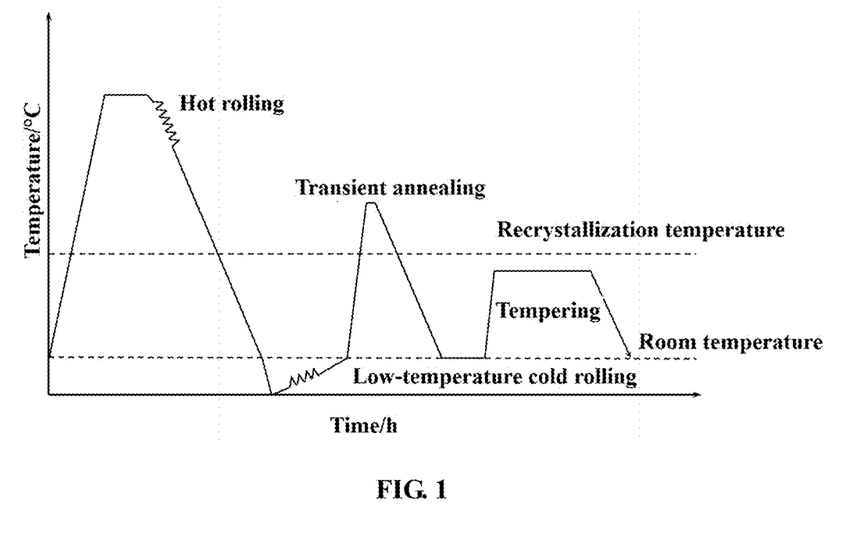
FIG. 1 shows a flowchart of a method for preparing a high-strength and high-plasticity TWIP steel according to an embodiment of the present disclosure.

A flowchart of a method for preparing a high-strength and high-plasticity TWIP steel according to the present disclosure is shown in FIG. 1. In the present disclosure, the low-temperature cold rolling, the transient annealing treatment and the low-temperature tempering treatment are sequentially performed on a hot-rolled TWIP steel plate to obtain the high-strength and high-plasticity TWIP steel.

The high-strength and high-plasticity TWIP steel according to the present disclosure includes, in percentages by mass, 0.45%-0.75% of C, preferably 0.60%-0.70% of C, and more preferably 0.62%-0.65% of C. In the present disclosure, the C element functions to greatly solid solution-strengthen TWIP steel, which is beneficial to improving the yield strength of the TWIP steel. The added C element further improves stability of austenite (by improving the driving force required for transformation to γ-martensit), which is beneficial to ensuring the plasticity of the TWIP steel. In the present disclosure, the mass content of C is controlled to be within the foregoing range, which is beneficial to obtaining a high-strength and high-plasticity TWIP steel. When the content of C element is excessively low, the work hardening capacity of the TWIP steel is reduced, thereby affecting the strength and plasticity of the TWIP steel.

The high-strength and high-plasticity TWIP steel according to the present disclosure includes, in percentages by mass, 16.20%-18.80% of Mn, preferably 17.50%-18.50% of Mn, and more preferably 17.62%-17.82% of Mn. In the disclosure, the added Mn element enables the enlargement of an austenite phase region and the stabilization of austenite, which is beneficial to improving plasticity of the TWIP steel; the substitutional solid solution of Mn in γ-Fe further shows strong proximity to C atoms, and therefore Mn and C often appear in pairs.

The high-strength and high-plasticity TWIP steel according to the present disclosure includes, in percentages by mass, 0.01%-0.05% of Ce, preferably 0.02%-0.05% of Ce, and more preferably 0.021%-0.041% of Ce. In the present disclosure, the added Ce element is beneficial to reducing the mobility of C atoms in TWIP steel, thereby improving critical stress of dynamic strain aging (DSA), and makes an improvement against deformation inhomogeneity caused by DSA during the processing of the TWIP steel, thereby improving the surface quality thereof during the plastic deformation processing. In addition, the position of Ce atoms could act as an H storage site to adsorb H atoms and inhibit the diffusion and segregation of the H atoms to a high stress place, thereby inhibiting H-induced delayed cracking. In addition, the added Ce element is beneficial to reducing stacking fault energy of steel and promoting the formation of deformation twins; that is to say, the TWIP effect is enhanced. In the present disclosure, the mass content of Ce element is controlled to be within the foregoing range. When the Ce content is higher, Ce-containing inclusion(s) would aggregate, which greatly reduces the plasticity of the TWIP steel. In the present disclosure, the Ce element has active chemical properties and could form a composite inclusion(s) with O and S, which has a lower density and could easily float up in the molten steel, thereby reducing the content of O and S in the molten steel and achieving the effect of purifying the molten steel. When some non-floating inclusions remain in a matrix, the stress concentration effect caused is lower, compared with $Al_2O_3$, because the inclusions are spherical and have lower hardness. When the plastic deformation is larger (greater than 40%), an improvement against micropore nucleation and growth at the inclusions could be achieved.

In some embodiments of the present disclosure, Ce is added in the form of an Fe—Ce master alloy. In some embodiments, the Fe—Ce master alloy has a Ce mass content of 5%. In some embodiments, the Fe—Ce master alloy has a solid solution 0 content of less than 0.005%.

The high-strength and high-plasticity TWIP steel according to the present disclosure includes, in percentages by mass, 0.02%-0.05% of Ba, preferably 0.02%-0.04% of Ba, and more preferably 0.022%-0.038% of Ba. In the present disclosure, as a purifying agent in the TWIP steel, Ba easily forms BaO with O in the molten steel, which reduces the O content in the steel matrix, thereby improving the yielding rate of Ce, exerting the micro-alloying effect of Ce and enhancing the TWIP effect. In addition, the hardness of an oxide of Ba is extremely low, which does not easily cause a stress concentration effect that results in the aggregation and growth of micropores and the decrease in the strength of the TWIP steel. In the present disclosure, the Ce and Ba elements easily combine with O and S in steel to form submicron rare earth composite inclusions, so that large-sized inclusions are removed, and meanwhile the size and morphology of MnS and $Al_2O_3$ inclusions that may remain in steel could be further optimized. In addition, there is a great difference between the atomic radius of Ce atom or Ba atom and that of Fe atom, and distortion energy caused by dissolution in the crystal is far greater than that in a grain boundary area, and thus the Ce atoms and Ba atoms are enriched at and near the grain boundary in large quantities, reducing the segregation of impurity elements such as P and S, thereby achieving grain boundary toughening and improving the plasticity of the TWIP steel.

In some embodiments of the present disclosure, Ba is added in the form of a Si—Ba alloy, which has a Ba mass content of 30%, a Si mass content of 35%, and an Fe mass content of 35%.

The high-strength and high-plasticity TWIP steel according to the present disclosure includes, in percentages by mass, not more than 0.0015% of O, and preferably not more than 0.001% of O. In the present disclosure, the content of the O element is controlled to be within the foregoing range, which is beneficial to obtaining a high-strength and high-plasticity TWIP steel.

The high-strength and high-plasticity TWIP steel according to the present disclosure includes, in percentages by mass, not more than 0.003% of S, and preferably not more than 0.002% of S. In the present disclosure, the content of the S element is controlled to be within the foregoing range, which is beneficial to obtaining a high-strength and high-plasticity TWIP steel.

The high-strength and high-plasticity TWIP steel according to the present disclosure includes, in percentages by mass, not more than 0.012% of P, and preferably not more than 0.01% of P. In the present disclosure, the content of the P element is controlled to be within the foregoing range, which is beneficial to obtaining a high-strength and high-plasticity TWIP steel.

In addition to the foregoing elements, the high-strength and high-plasticity TWIP steel according to the present disclosure further includes, in percentages by mass, the balance of Fe. In the present disclosure, the iron is used as an alloy matrix.

In the present disclosure, comprehensive properties of TWIP steel are improved through inclusion modification with Ce and Ba addition, fine grain strengthening and twinning nanocrystallization. Harmful effects of unfavorable inclusions are eliminated by means of Ce and Ba elements. Through microalloying effects of the elements and segregation at the grain boundary, grain boundary features are improved, and plasticity of the TWIP steel is improved. In addition, the grain size is adjusted and controlled by the low-temperature cold rolling, the transient annealing treatment and the low-temperature tempering treatment. Consider the addition of Ce, stacking fault energy of the TWIP steel is reduced, and the formation of twins and the division of twins into grains are promoted, which further reduces a mean free path of dislocation motion, thereby improving yield strength, and finally obtaining a high-strength and high-plasticity TWIP steel. In addition, the location of Ce atoms could be used as an H storage site, which could adsorb H atoms and inhibit the diffusion and segregation of the H atoms to a high stress place, thereby inhibiting H-induced delayed cracking.

The present disclosure further provides a high-strength and high-plasticity TWIP steel prepared by the method according to the foregoing technical solutions, wherein a microstructure of the high-strength and high-plasticity TWIP steel includes austenite structured grains and nano twins. In the present disclosure, the nano twins divide into grains, which further reduces a mean free path of dislocation motion, thereby improving yield strength of the TWIP steel.

In some embodiments of the present disclosure, the austenite structured grains have a grain size of 1-5 μm. In some embodiments, a distance between the nano twins is in the range of 1-2 nm.

In some embodiments of the present disclosure, the high-strength and high-plasticity TWIP steel has a yield strength of greater than 800 MPa, a tensile strength of greater than 1200 MPa, an elongation of greater than 50% and a product of strength and elongation of greater than 65 GPa·%.

The technical solutions in the present disclosure are clearly and completely described below with reference to the examples of the present disclosure. Apparently, the described examples are merely some rather than all of the examples of the present disclosure. All other examples obtained by a person of ordinary skill in the art based on the Examples of the present disclosure without creative labor shall fall within the scope of the present disclosure.

Example 1

A high-strength and high-plasticity TWIP steel consisted of the following elements (in percentages by mass): C: 0.65%, Mn: 17.82%, Ce: 0.021%, Ba: 0.022%, O: 0.0012%, S: 0.002%, P: 0.011%, and the balance of Fe.

The high-strength and high-plasticity TWIP steel was prepared according to the following procedures.

(1) A TWIP steel forging ingot (wherein Ce was introduced by adding an Fe—Ce master alloy, which had a Ce mass content of 5%, and a solid solution O content of less than 0.005%, to raw materials for smelting; Ba was introduced by adding in the form of a Si—Ba alloy, which had a Ba mass content of 30%, a Si mass content of 35%, and an Fe mass content of 35%, to raw materials for smelting) was maintained at 1200° C. for 2 h, i.e. being subjected to a homogenizing annealing, and then subjected to a hot rolling for 5 passes at an initial rolling temperature of 1150° C. with a reduction per pass of 35% and a total reduction rate of 85%, obtaining a hot-rolled TWIP steel plate.

(2) The foregoing hot-rolled TWIP steel plate was maintained at −50° C. for 1 h and then subjected to a cold rolling with a cold rolling reduction rate of 30%, obtaining a cold-rolled plate. The cold-rolled plate was maintained at 800° C. for 60 s in a protective atmosphere in a furnace, and air cooled to room temperature, obtaining an annealed rolled plate. The annealed rolled plate was maintained at 450° C. for 2 h in a muffle furnace, i.e. being subjected to a tempering treatment, and then air cooled to room temperature, obtaining a high-strength and high-plasticity TWIP steel, wherein the austenite structured grains in the TWIP steel had a grain size of 1-5 μm, and a distance between nano twins was 1-2 nm.

Figure 2:
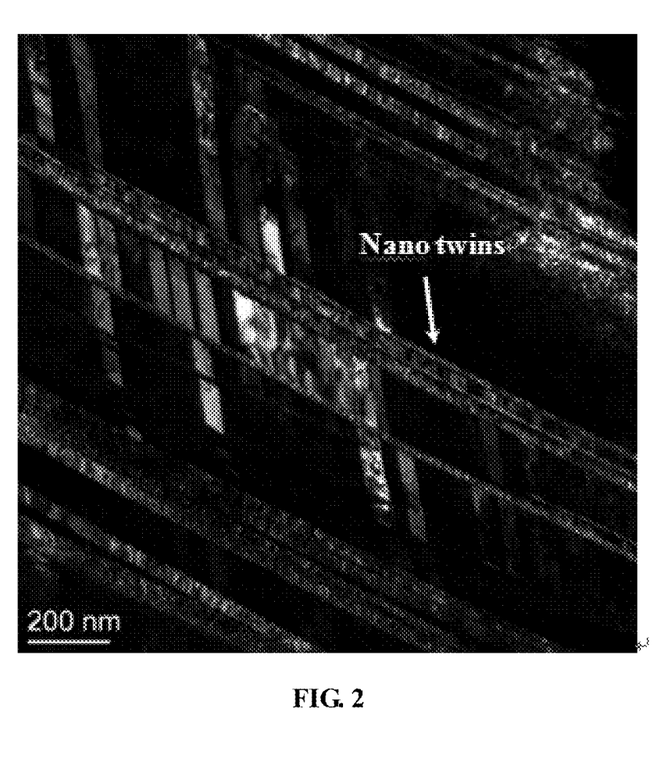
FIG. 2 is a field emission scanning electron microscope image of the high-strength and high-plasticity TWIP steel prepared in Example 1 of the present disclosure.

FIG. 2 is a field emission scanning electron microscope image of the high-strength and high-plasticity TWIP steel prepared in this Example. It can be seen from FIG. 2 that the high-strength and high-plasticity TWIP steel prepared in this Example has nano twins with a high density, which imparts high strength to the TWIP steel.

Figure 3:
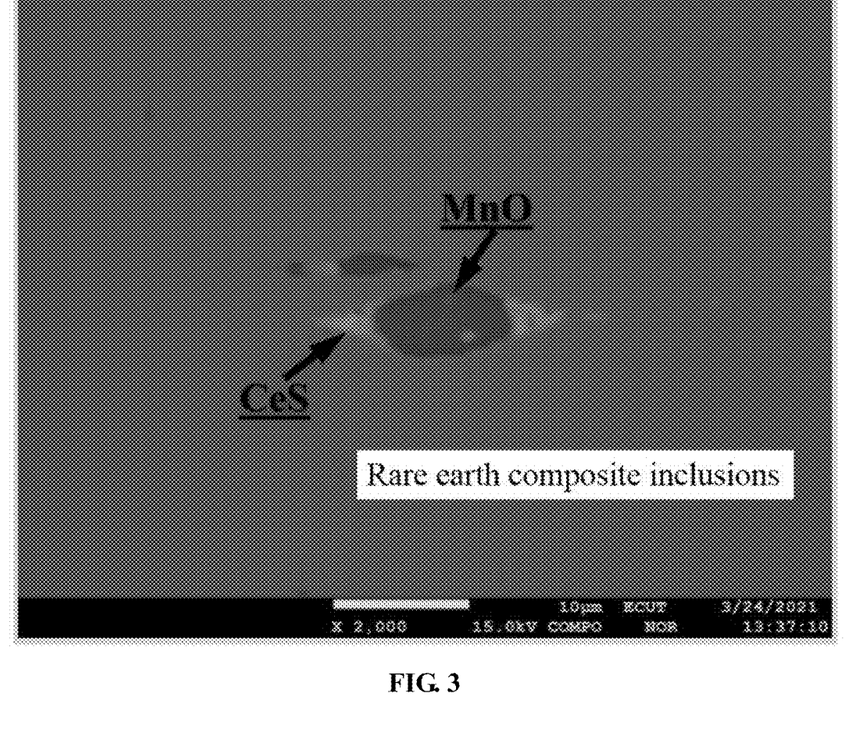
FIG. 3 shows an electron probe diagram of inclusions in the high-strength and high-plasticity TWIP steel prepared in Example 1 of the present disclosure.

FIG. 3 shows an electron probe diagram of inclusions in the high-strength and high-plasticity TWIP steel prepared in this Example. It can be seen from FIG. 3 that Ce has a modifying effect on inclusions, inhibits the nucleation and growth of micropores, delays occurrence of necking, and thereby is beneficial to improving plasticity of the TWIP steel.

Example 2

A high-strength and high-plasticity TWIP steel consisted of the following elements (in percentages by mass): C: 0.62%, Mn: 17.62%, Ce: 0.041%, Ba: 0.024%, O: 0.0012%, S: 0.002%, P: 0.011%, and the balance of Fe.

The high-strength and high-plasticity TWIP steel was prepared according to the following procedures.

(1) A TWIP steel forging ingot (wherein Ce was introduced by adding in the form of an Fe—Ce master alloy, which had a Ce mass content of 5%, and a solid solution O content of less than 0.005%, to raw materials for smelting; Ba was introduced by adding in the form of a Si—Ba alloy, which had a Ba mass content of 30%, a Si mass content of 35%, and an Fe mass content of 35%, to raw materials for smelting) was maintained at 1200° C. for 2 h, i.e. being subjected to a homogenizing annealing, and then subjected to a hot rolling for 5 passes at an initial rolling temperature of 1150° C. with the a reduction per pass of 35% and a total reduction rate of 85%, obtaining a hot-rolled TWIP steel plate.

(2) The foregoing hot-rolled TWIP steel plate was maintained at −50° C. for 1 h and then subjected to a cold rolling with a cold rolling reduction rate of 30%, obtaining a cold-rolled plate. The cold-rolled plate was maintained at 800° C. for 120 s in a protective atmosphere in a furnace, and air cooled to room temperature, obtaining an annealed rolled plate. The annealed rolled plate was maintained at 500° C. for 1 h in a muffle furnace i.e. being subjected to a tempering treatment, and then air cooled to room temperature, obtaining a high-strength and high-plasticity TWIP steel.

Example 3

A high-strength and high-plasticity TWIP steel consisted of the following elements (in percentages by mass): C: 0.63%, Mn: 17.66%, Ce: 0.031%, Ba: 0.038%, O: 0.0012%, S: 0.002%, P: 0.011%, and the balance of Fe.

The high-strength and high-plasticity TWIP steel was prepared according to the following procedures.

(1) A TWIP steel forging ingot (wherein Ce was introduced by adding in the form of an Fe—Ce master alloy, which had a Ce mass content of 5%, and a solid solution O content of less than 0.005%, to raw materials for smelting; Ba was introduced by adding in the form of a Si—Ba alloy, which had a Ba mass content of 30%, a Si mass content of 35%, and an Fe mass content of 35%, to raw materials for smelting) was maintained at 1200° C. for 2 h, i.e. being subjected to a homogenizing annealing, and then subjected to a hot rolling for 5 passes at an initial rolling temperature of 1150° C. with the a reduction per pass of 35% and a total reduction rate of 85%, obtaining a hot-rolled TWIP steel plate.

(2) The foregoing hot-rolled TWIP steel plate was maintained at −55° C. for 1 h and then subjected to a cold rolling with a cold rolling reduction rate of 35%, obtaining a cold-rolled plate. The cold-rolled plate was maintained at 800° C. for 120 s in a protective atmosphere, and air cooled to room temperature, obtaining an annealed rolled plate. The annealed rolled plate was maintained at 490° C. for 1 h in a muffle furnace, i.e. being subjected to a tempering treatment, and air cooled to room temperature, obtaining a high-strength and high-plasticity TWIP steel.

Comparative Example 1

This example was performed according to the procedures as described in Example 1, except that the TWIP steel forging ingot was different.

Finally, the prepared TWIP steel consisted of the following elements (in percentages by mass): C: 0.65%, Mn: 17.86%, O: 0.0012%, S: 0.002%, P: 0.011%, and the balance of Fe.

Comparative Example 2

This example was performed according to the procedures as described in Example 1, except that the TWIP steel forging ingot was different.

Finally, the prepared TWIP steel consisted of the following elements (in percentages by mass): C: 0.63%, Mn: 17.85%, Ce: 0.532%, Ba: 0.023%, O: 0.0012%, S: 0.002%, P: 0.011%, and the balance of Fe.

Comparative Example 3

This example was performed according to the procedures as described in Example 1, except that the TWIP steel forging ingot was different.

Finally, the prepared TWIP steel consisted of the following elements (in percentages by mass): C: 0.65%, Mn: 17.82%, Ce: 0.022%, O: 0.0012%, S: 0.002%, P: 0.011%, and the balance of Fe.

Comparative Example 4

This example was the same as Example 2, except that the low-temperature cold rolling was performed at 25° C.

Comparative Example 5

This example was the same as Example 2, except that the transient annealing treatment was performed for 1200 s.

Comparative Example 6

This example was the same as Example 2, except that the low-temperature tempering treatment was performed at 650° C.

Comparative Example 7

This example was the same as Example 1, except that a TWIP steel forging ingot (wherein Ce was introduced by adding a rare earth ferrosilicon alloy, which had a rare earth content of 60% (Ce accounted for 85% of the rare earth), and a solid solution O content of not less than 300 ppm, all in percentages by mass) was used.

Mechanical properties of the TWIP steels prepared in Examples 1 to 3 and Comparative Examples 1 to 7 were tested. Test results are shown in Table 1.

TABLE 1

Mechanical properties of the TWIP steels prepared in Examples 1 to 3 and Comparative Examples 1 to 7

| No. | C/% | Mn/% | Ce/% | Ba/% | Cold rolling temperature/° C. | Annealing time/s | Tempering temperature/° C. | Tensile strength/MPa | Yield strength/MPa | Elongation/% | Product of strength and elongation/ GPa. % |
|---|---|---|---|---|---|---|---|---|---|---|---|
| Example 1 | 0.65 | 17.82 | 0.021 | 0.022 | −50 | 60 | 450 | 1252 | 830 | 55.2 | 69.1 |
| Example 2 | 0.62 | 17.62 | 0.041 | 0.024 | −50 | 120 | 500 | 1322 | 863 | 50.6 | 66.9 |
| Example 3 | 0.63 | 17.66 | 0.031 | 0.038 | −55 | 120 | 490 | 1290 | 830 | 52.5 | 67.7 |
| Comparative Example 1 | 0.65 | 17.86 | — | — | −50 | 60 | 450 | 1168 | 754 | 45.4 | 53.0 |

TABLE 1-continued

Mechanical properties of the TWIP steels prepared in Examples 1 to 3 and Comparative Examples 1 to 7

| No. | C/% | Mn/% | Ce/% | Ba/% | Cold rolling temperature/ °C. | Annealing time/s | Tempering temperature/ °C. | Tensile strength/MPa | Yield strength/MPa | Elongation/% | Product of strength and elongation/ GPa. % |
|---|---|---|---|---|---|---|---|---|---|---|---|
| Comparative Example 2 | 0.63 | 17.85 | 0.532 | 0.023 | −50 | 60 | 450 | 1085 | 842 | 40.8 | 44.3 |
| Comparative Example 3 | 0.65 | 17.82 | 0.022 | — | −50 | 60 | 450 | 1207 | 827 | 51.6 | 62.3 |
| Comparative Example 4 | 0.62 | 17.62 | 0.041 | 0.024 | 25 | 120 | 500 | 1093 | 653 | 38.8 | 42.4 |
| Comparative Example 5 | 0.62 | 17.62 | 0.041 | 0.024 | −50 | 1200 | 500 | 963 | 384 | 60.6 | 58.4 |
| Comparative Example 6 | 0.62 | 17.62 | 0.041 | 0.024 | −50 | 120 | 650 | 983 | 687 | 49.3 | 48.5 |
| Comparative Example 7 | 0.64 | 17.88 | 0.011 | 0.022 | −50 | 60 | 450 | 1150 | 750 | 42.3 | 48.7 |

It can be seen from the foregoing examples that the TWIP steel prepared by the method according to the present disclosure has higher yield strength and plasticity, in which H-induced delayed cracking was inhibited. The prepared TWIP steel has a yield strength of 863 MPa, a tensile strength of 1322 MPa, an elongation of 50.6% and a product of strength and elongation of 66.9 GPa·%.

The above described are only preferred embodiments of the present disclosure. It should be noted that for a person of ordinary skill in the art, several improvements and polishings may be further made without departing from the principle of the present disclosure, and the improvements and polishings should also be regarded as falling within the scope of the present disclosure.

What is claimed is:

1. A method for preparing a TWIP steel, comprising sequentially performing a cold rolling, a annealing treatment and a tempering treatment on a hot-rolled TWIP steel plate to obtain a TWIP steel,
wherein the TWIP steel comprises, in percentages by mass, 0.45%-0.75% of C, 16.20%-18.80% of Mn, 0.01%-0.05% of Ce, 0.02%-0.05% of Ba, not more than 0.0015% of O, not more than 0.003% of S, not more than 0.012% of P, and a balance of Fe.

2. The method as claimed in claim 1, wherein Ce is added in a form of an Fe—Ce master alloy, which has a Ce mass content of 5%, and a solid solution O content of less than 0.005%; and
Ba is added in a form of a Si—Ba alloy, which has a Ba mass content of 30%, a Si mass content of 35%, and an Fe mass content of 35%.

3. The method as claimed in claim 2, wherein during the cold rolling, a total deformation of 20%-50% is caused.

4. The method as claimed in claim 1, wherein the cold rolling is performed at a temperature of −100° C. to −50° C.

5. The method as claimed in claim 1, wherein during the cold rolling, a total deformation of 20%-50% is caused.

6. The method as claimed in claim 5, wherein the annealing treatment is performed for 60-500 s.

7. The method as claimed in claim 1, wherein the annealing treatment is performed at an annealing temperature of 700-800° C.

8. The method as claimed in claim 1, wherein the annealing treatment is performed for 60-500 s.

9. The method as claimed in claim 1, wherein the tempering treatment is performed at a tempering temperature of 450-550° C.; and the tempering treatment is performed for 1-2 h.

* * * * *

UNITED STATES PATENT AND TRADEMARK OFFICE
CERTIFICATE OF CORRECTION

| | | |
|---|---|---|
| PATENT NO. | : 11,718,890 B2 | Page 1 of 1 |
| APPLICATION NO. | : 17/584059 | |
| DATED | : August 8, 2023 | |
| INVENTOR(S) | : Wang et al. | |

It is certified that error appears in the above-identified patent and that said Letters Patent is hereby corrected as shown below:

On the Title Page

Item (73) should read:
Assignees: Jiangxi University of Science and Technology, Ganzhou (CN); Guorui Scientific Innovation Rare Earth Functional Materials (Ganzhou) Co., Ltd, Ganzhou (CN)

Signed and Sealed this
Thirty-first Day of December, 2024

Derrick Brent
*Acting Director of the United States Patent and Trademark Office*